(12) United States Patent
Stringham

(10) Patent No.: US 10,881,173 B1
(45) Date of Patent: Jan. 5, 2021

(54) WALKING STICK WITH INTEGRATED WATER FILTRATION

(71) Applicant: Kyle Cobb Stringham, Ogden, UT (US)

(72) Inventor: Kyle Cobb Stringham, Ogden, UT (US)

( * ) Notice: Subject to any disclaimer, the term of this patent is extended or adjusted under 35 U.S.C. 154(b) by 0 days.

(21) Appl. No.: 16/774,815

(22) Filed: Jan. 28, 2020

(51) Int. Cl.
  *A45B 3/00* (2006.01)
  *C02F 1/00* (2006.01)
  *A45B 9/00* (2006.01)

(52) U.S. Cl.
  CPC .............. *A45B 3/00* (2013.01); *C02F 1/002* (2013.01); *A45B 2009/002* (2013.01)

(58) Field of Classification Search
  CPC .............. A45B 3/00; A45B 2009/002; A45B 2009/007; A45B 9/00; A45B 2009/005; A45B 2200/055; A61H 3/02; A61H 3/00; C02F 1/003; C02F 2307/02; C02F 1/002; A63C 11/221; A63C 11/228; A63C 11/22
  USPC ........ 135/65–66, 72, 77; 280/809, 816, 819, 280/822; 215/308; 210/224, 251
  See application file for complete search history.

(56) References Cited

U.S. PATENT DOCUMENTS

| | | | | |
|---|---|---|---|---|
| 255,299 A * | 3/1882 | Keam | ............. | A45B 3/00 135/66 |
| 2,438,014 A * | 3/1948 | Lukowitz | ............. | A45B 3/00 135/66 |
| 3,038,483 A * | 6/1962 | Altsheler | ............. | F41B 9/004 135/16 |
| 3,443,820 A * | 5/1969 | Baker | ............. | A63C 11/222 280/816 |
| 3,820,182 A * | 6/1974 | Vockroth | ............. | A47L 13/00 15/1.7 |
| 3,982,531 A * | 9/1976 | Shaffer | ............. | A61F 5/012 601/152 |
| 4,229,015 A * | 10/1980 | Ramsey | ............. | A63C 11/222 135/66 |
| 4,584,733 A * | 4/1986 | Tietge | ............. | E04H 4/16 15/1.7 |
| 8,496,017 B2 * | 7/2013 | Haddad | ............. | A45B 3/00 135/66 |
| 2005/0211284 A1 * | 9/2005 | Dooley | ............. | A45B 3/00 135/65 |
| 2011/0132419 A1 * | 6/2011 | Forrester | ............. | A45B 3/14 135/66 |

(Continued)

*Primary Examiner* — Noah Chandler Hawk
(74) *Attorney, Agent, or Firm* — Sandy Lipkin

(57) ABSTRACT

An embodiment includes a walking stick. The walking stick includes a rod assembly, a water purification assembly, and a manual pump. The rod assembly extends from a first end to a second end that is opposite the first end along a longitudinal direction of the rod assembly. The rod assembly includes at least one rod portion. The water purification assembly is integrated with the rod assembly. The manual pump is configured to impose a pressure gradient in the water purification assembly. The manual pump includes a plunger that is physically coupled to a handle portion. Motion of the plunger relative to the water purification assembly draws water into an inlet tube that is positioned in the rod portion and through the water purification assembly. The motion of the plunger results from translation of the handle portion in substantially the longitudinal direction of the rod assembly.

8 Claims, 13 Drawing Sheets

(56) References Cited

U.S. PATENT DOCUMENTS

| | | | |
|---|---|---|---|
| 2013/0319915 A1* | 12/2013 | Gellibolian | C02F 1/002 210/87 |
| 2016/0031721 A1* | 2/2016 | Kellam | C02F 9/005 210/244 |
| 2019/0191833 A1 | 6/2019 | Stringham | |

* cited by examiner

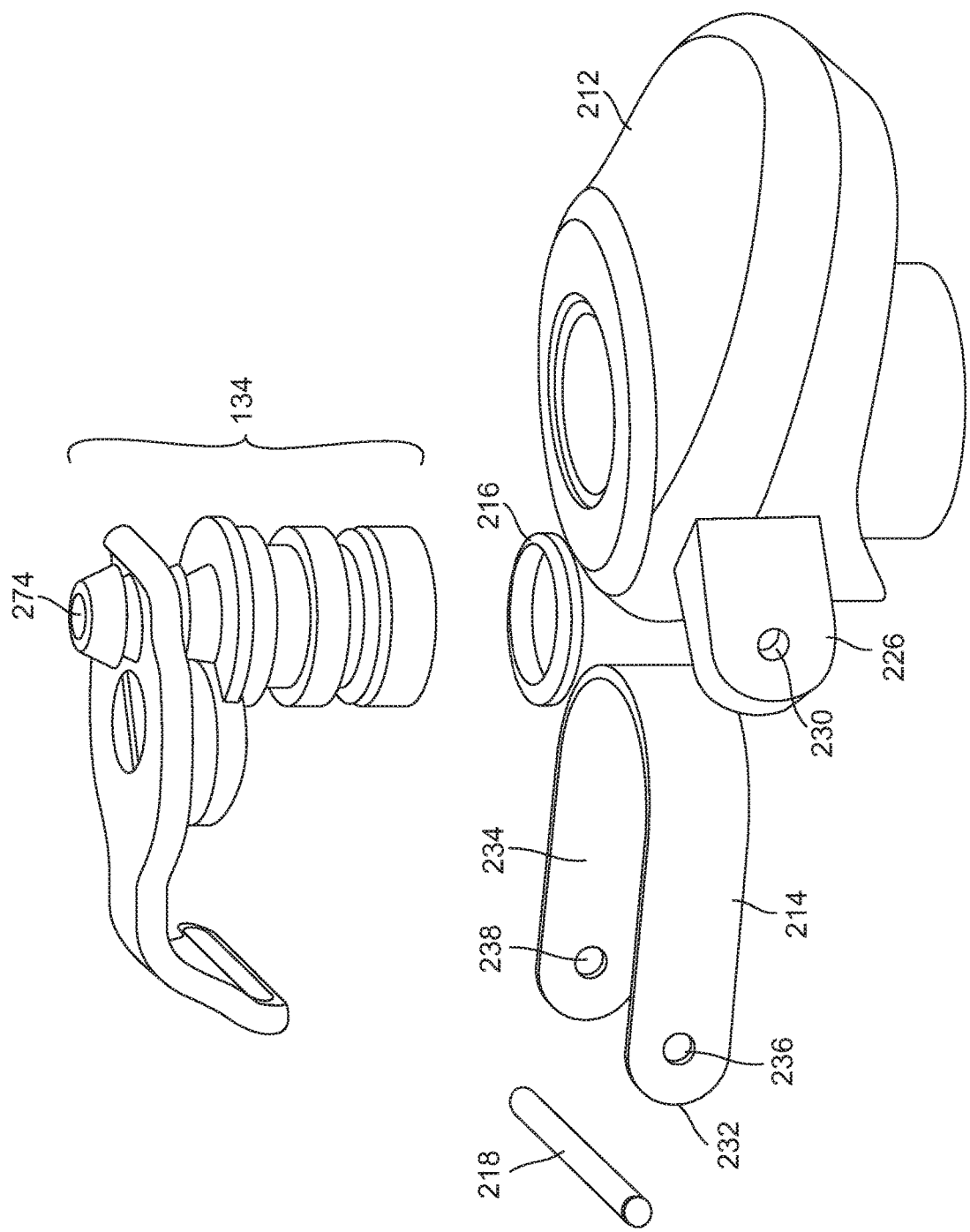

WALKING STICK WITH INTEGRATED WATER FILTRATION

BACKGROUND OF THE INVENTION

Field of the Invention

The field of this invention relates generally to the field of walking sticks and more specifically toward a walking with stick with integrated water filtration.

Description of the Prior Art

Obtaining drinkable or potable water when away from trustworthy public water sources can be problematic. For instance, while outdoors, such as during hiking trips, individuals may carry portable water obtained from a trustworthy source. Individuals may drink the water during a hike to maintain adequate levels of hydration. However, it is difficult to estimate an amount of water that is sufficient to maintain a healthy level of hydration. For instance, the temperature may be hotter than expected, which may increase consumption of the water. Moreover, water is heavy. Accordingly, carrying a water may introduce an additional load.

Additionally or alternatively, individuals may carry a portable water filtration system (filtration system). Filtration systems enable a user to draw water from a naturally occurring water source, such as a stream or lake, and to filter the water. However, filtration systems are an extra piece of equipment that is often forgotten and poorly-maintained. Moreover, through attempts to minimize the volume and weight of filtration systems, the functionality of some filtration systems has been reduced. For instance, use of some filtration systems involves the user laying on her stomach and putting her face near the water source. Additionally, filtration systems are stored while walking, which may introduce additional steps in obtaining potable water and may reduce the number of times users hydrate.

The subject matter cleaned herein is not limited to embodiments that solve any disadvantages or that operate only in environments such as those described above. Rather, this background is only provided to illustrate one example technology area where some embodiments described herein may be practiced. The invention is an improvement on devices by the instant inventor, which include U.S. Patent Publication No. 2019/0191833 and U.S. patent application Ser. No. 16/504,144.

SUMMARY OF THE INVENTION

The basic embodiment of the present invention teaches walking stick, comprising: a rod assembly that extends from a first end to a second end along a longitudinal direction of the rod assembly, wherein the rod assembly includes at least one rod section; a water purification assembly that is integrated with the rod assembly, and a pump mechanism that is configured to impose a pressure gradient in the water purification assembly, wherein the pump mechanism includes a plunger that is physically coupled to a handle portion, said plunger being surrounded by a protective sheath, motion of the plunger relative to the water purification assembly draws water into an inlet tube that is positioned in the rod section and through the water purification assembly, and the motion of the plunger results from translation of a handle portion in substantially the longitudinal direction of the rod assembly; a water inlet assembly with a first filter inside of a first filter housing wherein the water purification assembly includes a filter inlet and a second filter housing; and the filter housing define a filter volume configured to receive a second filter device that is configured to remove at least a portion of contaminants from the water through imposition of the pressure gradient in the inlet tube and the filter volume.

The above embodiment can be further modified by defining that said first filter includes an aperture that his offset from said first end that can rotated to line up with an aperture in said first end.

The above embodiment can be further modified by defining that said a plunging valve sits atop said plunger, said plunger valve having a plurality of apertures through which water can flow upwardly therethrough from said rod assembly, said plunging valve being checked by an umbrella valve above said plunging valve.

The above embodiment can be further modified by defining that a wiper valve sits atop said umbrella valve to wipe the interior of said sheath clean of particulates.

The above embodiment can be further modified by defining that a filter connection piece is situated above said wiper valve wherein said filter connection piece includes two upwardly projecting members that screw into the bottom of said second filter.

The above embodiment can be further modified by defining that said second filter housing is topped with an cap that threadably attaches to a hex-shaped fitting to secure said second filter housing to said walking stick.

The above embodiment can be further modified by defining that a handle assembly comprising a grip that attaches to said second filter housing wherein a rod portion is embedded inside of said grip, said rod portion attaching to said cap on one end and extending towards a top cap on the opposite end.

The above embodiment can be further modified by defining that said top cap has a conduit attachable to said rod portion and a groove on the underside of said top cap with two extending members.

The above embodiment can be further modified by defining that a steel reinforcing member of the same shape as said groove on said underside of said top cap including corresponding first and second members wherein said reinforcing member sits inside of said groove to provide reinforcement to said top cap.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 6A is a side exploded view of the outlet portion of the of the walking stick of the instant invention.

DETAILED DESCRIPTION OF A PREFERRED EMBODIMENT

Figure 1:
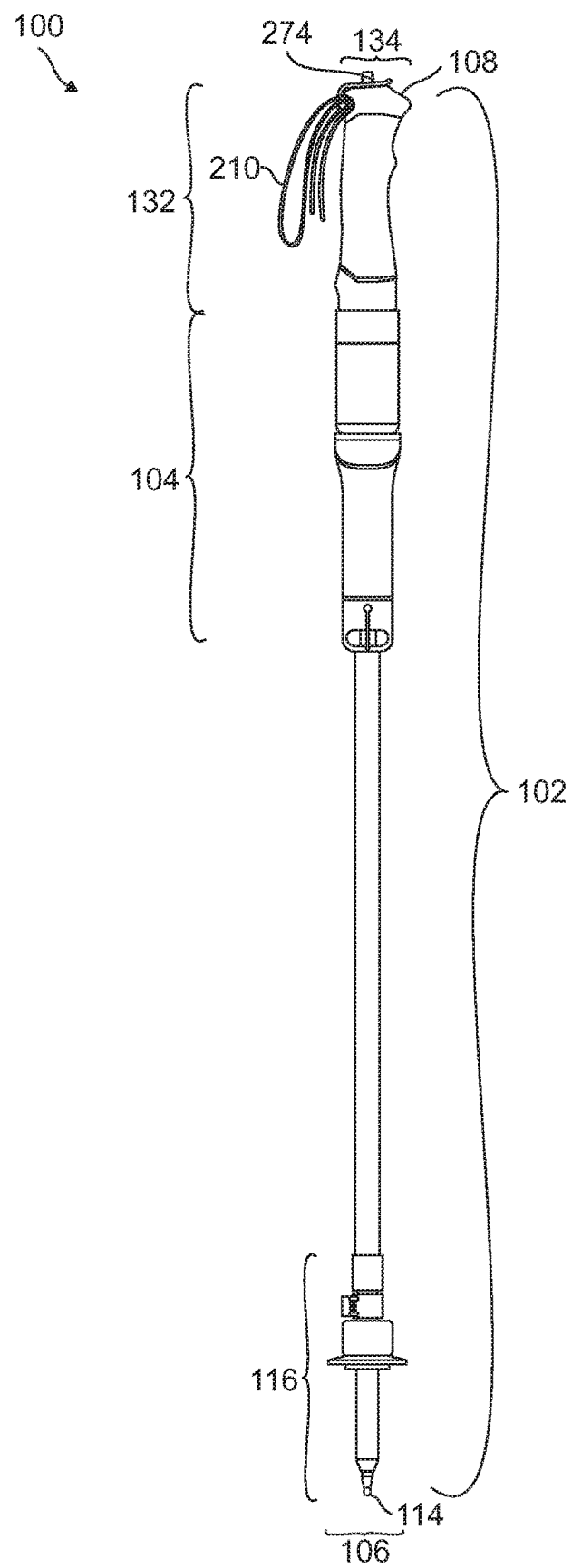
FIG. 1 is a side view of the exterior of the walking stick of the instant invention.

Turning to the drawings, the preferred embodiment is illustrated and described by reference characters that denote similar elements throughout the several views of the instant invention.

FIGS. 1-6B illustrate various views of various sections of an example walking stick with integrated water filtration (hereinafter, "walking stick") 100.

The walking stick 100 may be used to support or aid in support of a user during activities such as walking, hiking, trekking, backpacking, camping, etc. For instance, the user may grip a portion of the walking stick such as a handle grip that is located on a first end of the walking stick 100 during the activity. Walking stick 100 may enable transfer of a portion of the weight of the user to the walking stick 100, which may assist and stability of the user and/or may reduce stress on the legs and/or the back of the user.

Additionally, the walking stick 100 enables a user to obtain potable drinkable water from a natural source such as a river or a stream and/or an untrustworthy source such as a fountain, a well, or a drinking fountain. For example, the user may place a portion of the walking stick 100 in the natural source or the untrustworthy source (collectively, "a source or sources"). The user may then operate a mechanism in the walking stick 100 to draw water from the source and force the water through a filter. As the water passes through the filter, contaminants or some portion thereof may be removed, which may make the water from the source suitable to drink or otherwise use (e.g., wash, cook, mix with other consumables, etc.)

The walking stick 100 may include a rod assembly 102 and a water purification assembly 104. The water purification assembly 104 is integrated with and/or into the rod assembly 102. For instance, the general external structure of the rod assembly 102 incorporates the general external structure of the water purification assembly 104 to make a substantially cylindrical structure. The overall external structure and appearance of the walking stick 100 includes a series or set of substantially cylindrical portions with similar diameters. In some embodiments, the outer diameter of the water purification assembly 104 or portion thereof may be substantially similar to or the same as at least one of the outer diameters of the rod assembly 102.

Integration of the water purification assembly 104 with or into the rod assembly 102 may result in an improvement in the function of the walking stick 100 compared to walking sticks in which a water purification assembly is offset from the rod assembly 102. For instance, during used in the activity and between instances of obtaining water from the source, the user may use the walking stick 100 similar to how the user would use a walking stick without the water purification assembly. Additionally, the integration reduces an overall external profile of the walking stick 100 and may conceal the water purification assembly. Additionally still, a transition from use of the walking stick 100 as a walking stick (e.g., for support) to use as a water filter is minimized. For example, the user does not have to significantly reconfigure the walking stick 100 use as a water filter.

The rod assembly extends between opposite ends 106, 108 of the walking stick 100. Between the opposite ends 106, 108, a length of the walking stick may be defined. The length is defined along the longitudinal direction. The length may depend on a particular application or activity for which the walking stick 100 is designed. For example, the walking stick 100 may be designed for children, adults, taller people, strenuous hiking, walking, etc. The lengths may be different for each of these. For instance, for children the length may be short (e.g., between about 24 inches and about 40 inches). Alternatively, the walking stick 100 may be designed for adults. In these embodiments, the length may be between about 48 inches and about 59 inches in some embodiments.

In these and other embodiments, the walking stick 100 may include one or more components or features that enable the length to be adjusted. For example, the rod assembly may include one or more rod sections 110, 112. The rod sections 110, 112 may be selectively secured relative to one another. For instance, a first rod section 112 may include a smaller diameter than a second rod section 110. The first rod section 112 may accordingly be able to be translated into and within the second rod section 110 and to be selectively retained within a second rod section 110.

The walking stick 100 defines one or more openings 114 at a first end 106 of the rod assembly and one or more openings 274 at the second end 108 of the assembly. In the depicted embodiment, the openings 114 at the first end 106 are defined in a rod tip 116 near the first end 106. In other embodiments, the openings 114 may be positioned at the first end 106. For instance, instead of a point or integrated into the point, the opening(s) 114 may be defined. The openings 114 may enable water to enter the walking stick 100 from the source.

The rod assembly 102 may define a volume that is fluidly coupled to the water purification assembly. The rod assembly 102 may be lined or may be comprised of a food grade plastic or another suitable material. The rod assembly 102 is configured to enable transport of the water from the opening 114 to the water purification assembly 104. Accordingly, the walking stick 100 includes an inlet volume that is defined from the opening to the water purification assembly. The inlet volume fluidly couples the opening to the water purification assembly.

To draw the water into the walking stick 100, the first end 106 may be placed in a source such that the opening 114 located on the first end 106 is submerged in the water source. Pressure gradient may be imposed in the water purification assembly 104 and the inlet volume. The pressure gradient may act to draw the water from the source into the inlet volume and to the water purification assembly 104. The water purification assembly 104 is configured to filter water. One or more structural features of the walking stick 100 assist in the delivery of the water to the water purification assembly 104. In addition, one or more structural features of the walking stick 100 enable access to filtered water as it exits the water purification assembly 104.

Figure 2A:
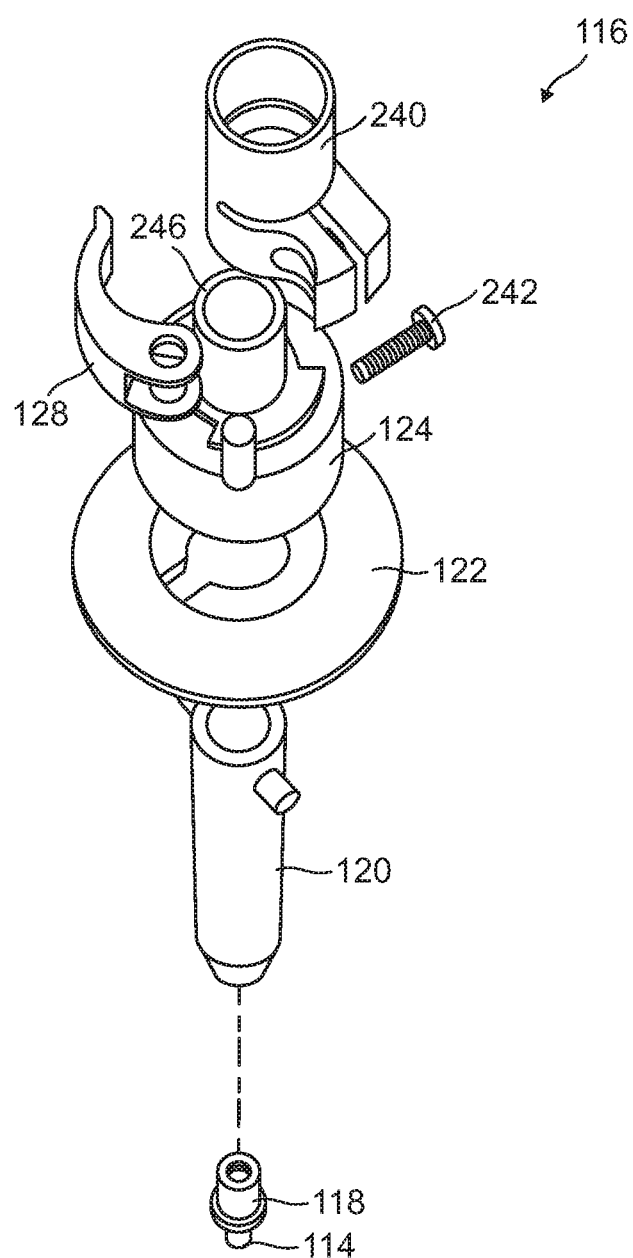
FIG. 2A is a top exploded view of the water intake end of the walking stick of the instant invention.
Figure 2B:
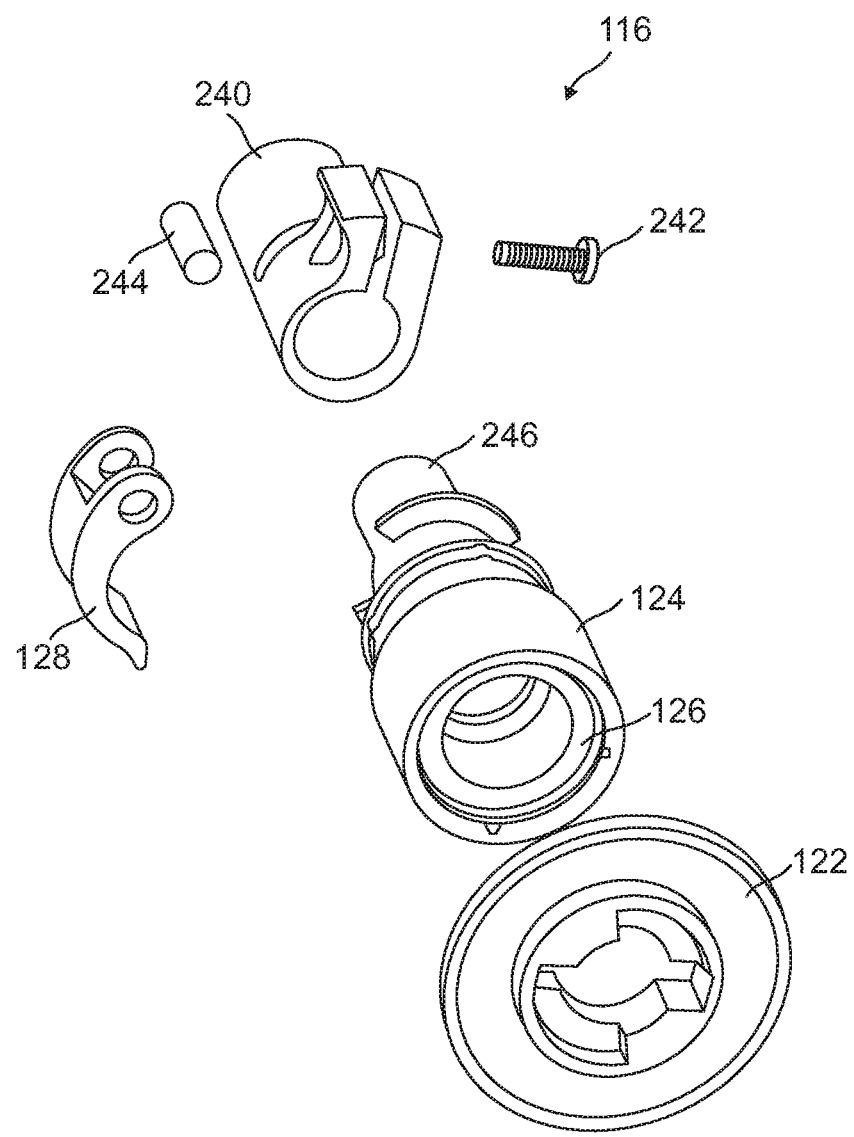
FIG. 2B is an angled away top exploded view of a portion of the water intake end of the walking stick of the instant invention.
Figure 2C:
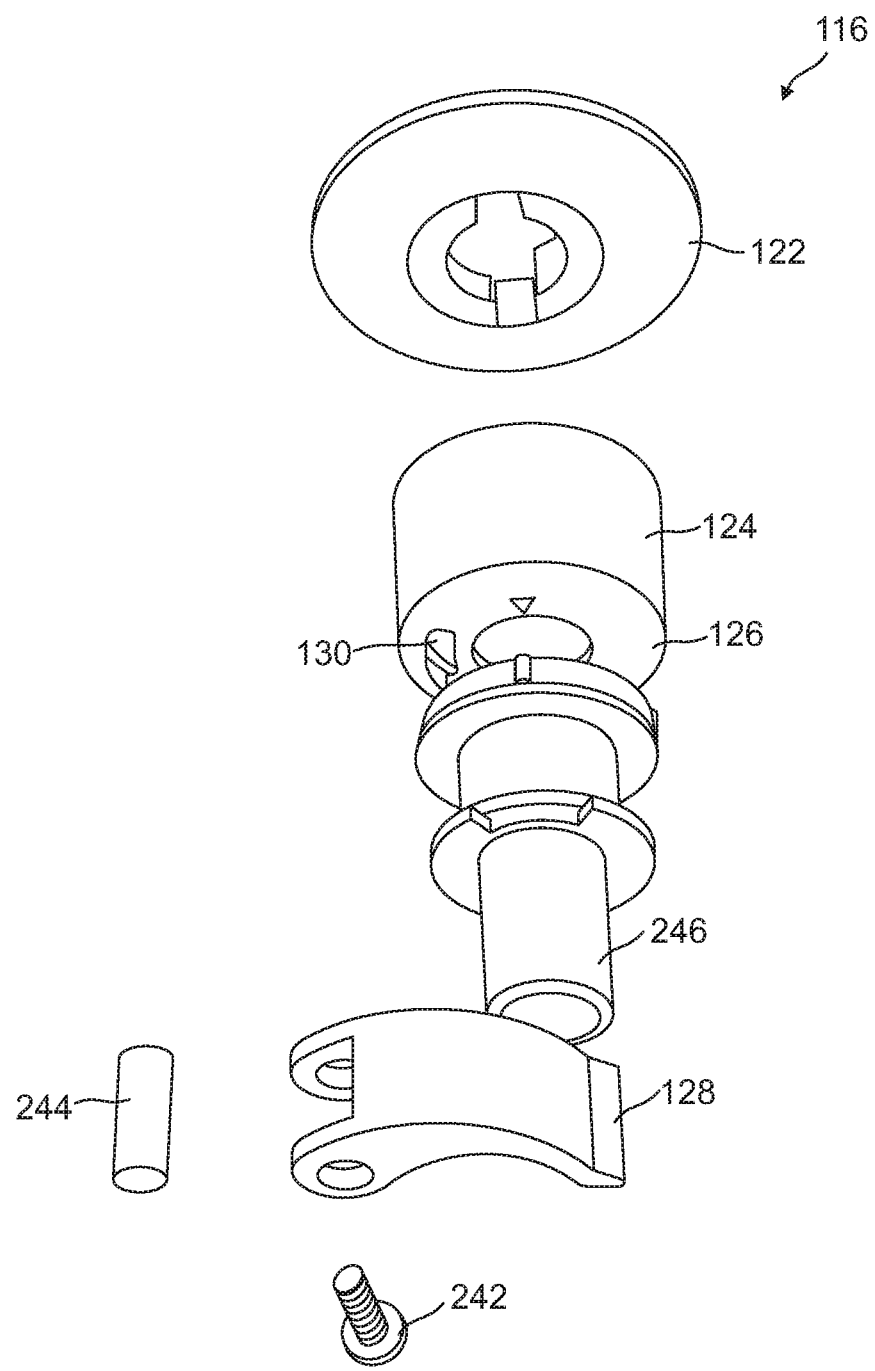
FIG. 2C is a bottom exploded view of a portion of the water intake end of the walking stick of the instant invention.
Figure 3:
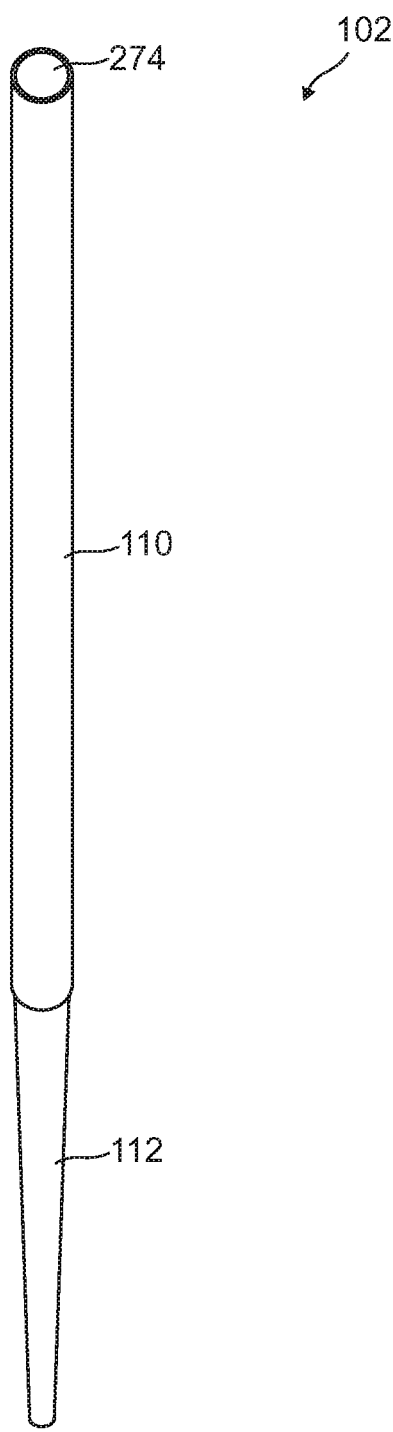
FIG. 3 is a top perspective view of the dual rod portion of the walking stick of the instant invention.

FIGS. 2A-2C show exploded views of the rod first end 106 inlet assembly 116. As illustrated the first end 106 of the rod assembly 102 includes an opening 114 at the end of a tip 118 that is threadably attached to widened conduit 120 that attaches to a pole basket 122 that is attached to a housing 124 that has a foam filter 126 situated therein (See FIG. 2B). A cam lock 128 allows for the securing and/or removal of the housing 124 and filter 126 from the inlet assembly 116. On the underside of the housing 124, there is an offset aperture 130 that provides that by rotating the housing 124, the aperture 130 is aligned with the opening 114 at the end of the tip 118 thereby allowing for the flow of water upward therefrom. Water enters the walking stick 100 through the opening 114 at the end of the tip 118 and moves upward through the foam filter 126 thereby providing the initial filtration of water through the walking stick 100.

Once water has passed through the foam filter 126 it travels up the rod assembly 102 until it reaches the water purification assembly 104. As the water passes through the water purification assembly 104 (see FIGS. 4A-5A, described in detail below), it continues to travel through the handle assembly 132 where it terminates in the outlet assembly 134 (See FIGS. 5A-6B, described in detail below) where filtered water can be collected therefrom.

The outlet assembly 134 includes an exposed end 108 that is externally accessible. For example, a user may access filtered water from the outlet assembly 134. The outlet assembly 134 is fluidly coupled to the water purification assembly 104. For example, filtered water that exits the walking stick 100 by the outlet assembly 134 after it has passed through a water purification assembly 104.

The pressure gradient imposed in the water purification assembly forces the water drawn from the source through the water purification assembly 134. After the water passes through the water purification assembly, it is considered filtered water. The filtered water is then pushed out of the walking stick 100 via the outlet assembly 134. The user may collect the filtered water at the outlet assembly 134.

The water purification assembly 104 is illustrated in detail from a variety of angles in FIGS. 4A-5A. At the end of the water purification assembly 104 nearest the dual rods. 110, 112 is the bottom cap 136 which is attached to the top rod 110 and secured thereto with a locking nut 140 and screw 142. The bottom cap 136 is made of a hard, durable plastic and includes an aperture 138 near the bottom with a slot 248 for the screw 142 to enter therethrough which is secured and tightened to the rods 110, 112 with the nut 140 providing a seal. Inside of the cap 136 which is substantially cylindrical in shape are a series of threads 146 that allow the bottom cap 138 to be secured to a sheath 152 that houses a detachable rod that remains in fluid communication with the inlet rods 110, 112 thereby allowing water to pass therethrough.

Between the sheath 152 and the bottom cap 136 is a sleee 144 that allows the assembly to remain intact during plunging. The sheath 152 has at its bottom end those threads 148 that connect with the threads 146 on the bottom cap 138. Inside of the sheath 152 is the internal rod piece that acts as a plunger 150 as it is pressed down through the rod assembly 102 (seen in phantom in FIG. 4B). The rod plunger piece 150 terminates at the top in a flange that rests in the upper valve bed 156 of the sheath 152 that is surrounded by its own flange 154 that creates the bed 156 for the resting of the top portion of the plunger rod 150 thereon.

Figure 4A:
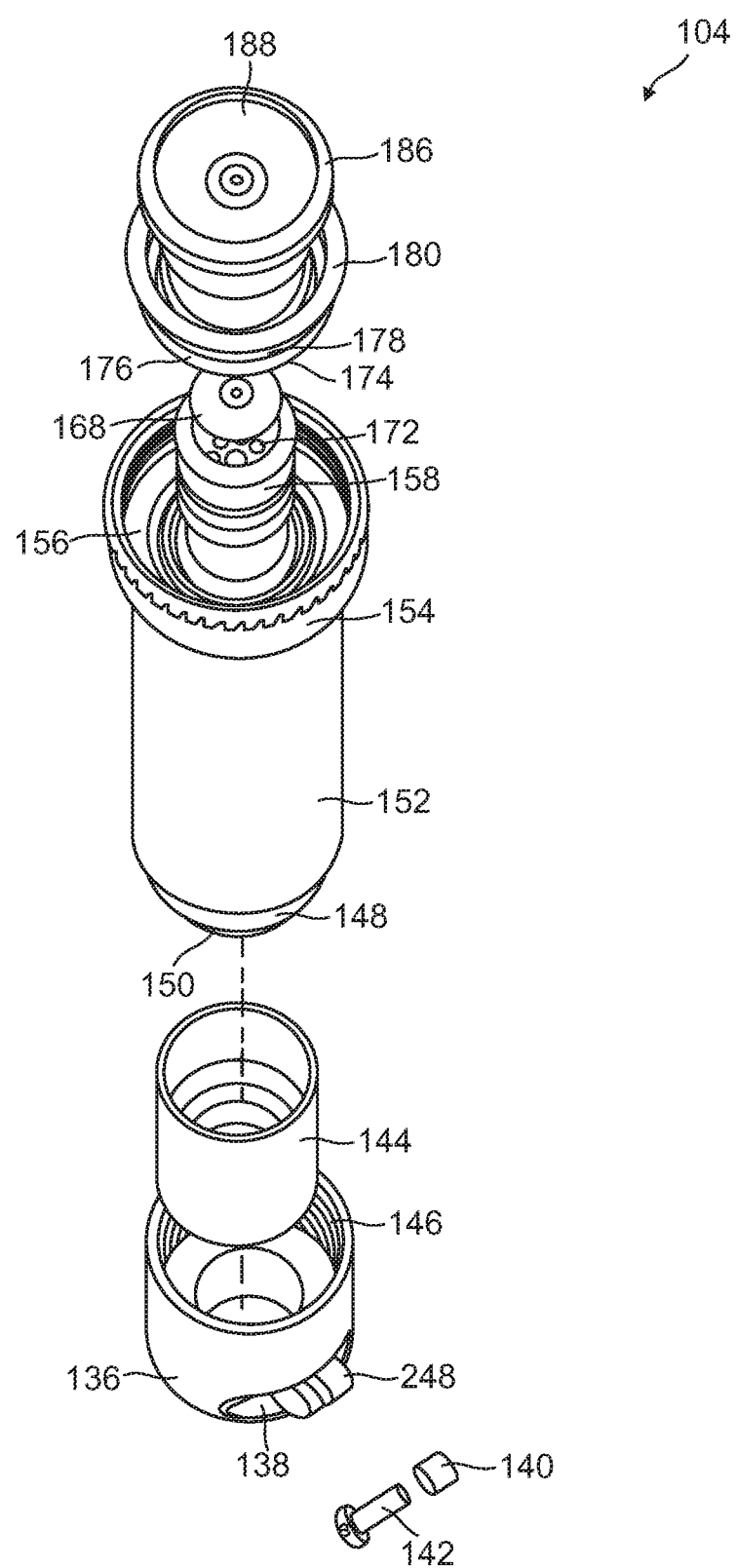
FIG. 4A is a top exploded view of the plunger portion of the walking stick of the instant invention.
Figure 4B:
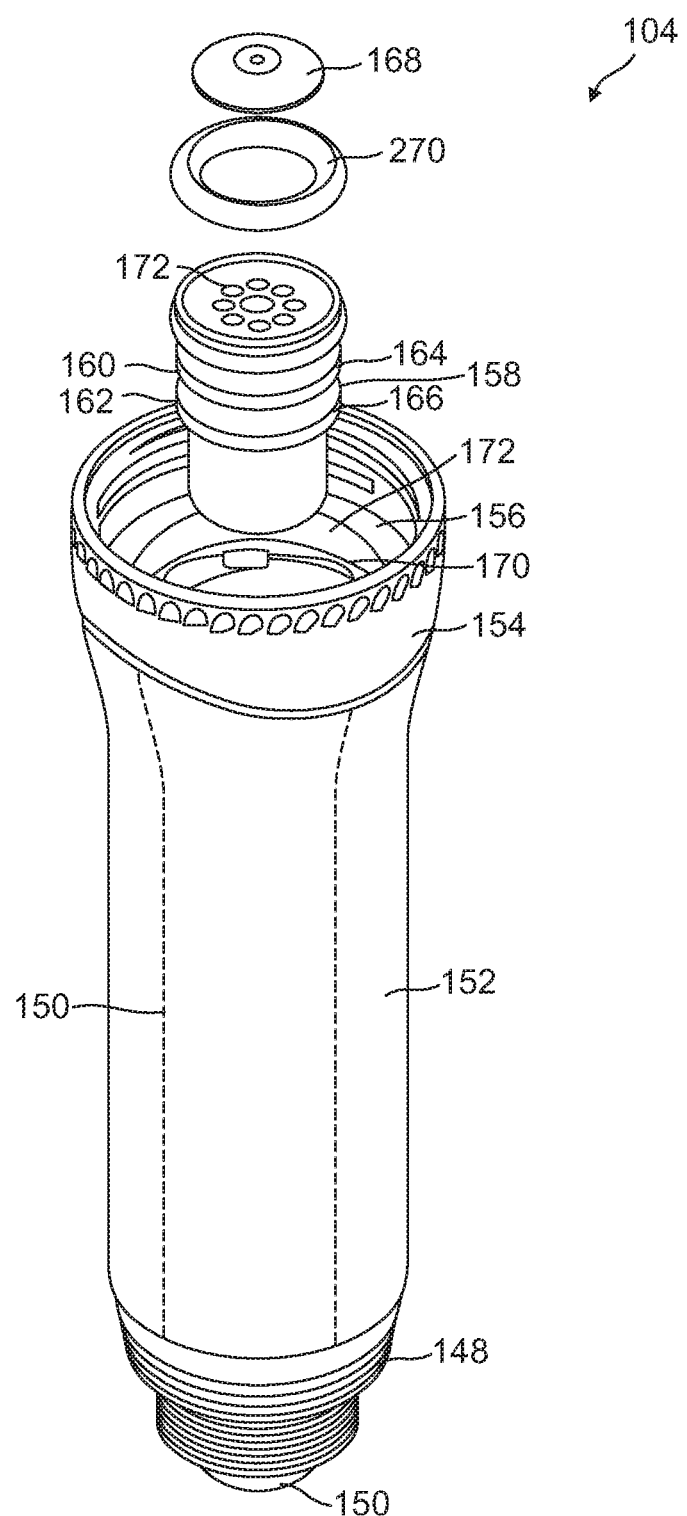
FIG. 4B is an angled away top exploded view of a portion of the plunger portion of the walking stick of the instant invention.

FIG. 4B shows the sheath 152 with the top components in exploded view. Inside of the sheath 152 and above the plunger rod portion 150 sits a plunger valve 158 having a bottom portion that sets inside of the sheath 152. The plunger valve 158 includes grooves 160, 162 for at least two gaskets 164, 166 but can use as many as is suitable to provide a tight seal between the plunger valve 158 and the plunging rod 150 inside of the sheath 152. On the top of the plunger valve 158 are a series of apertures 172 through which water passes upwardly therethrough when the plunging rod 150 is moved up and down through the rod assembly 102. Above the plunger valve 158 is a gasket 270 above which is an umbrella valve 168. When the plunger rod 150 is moved downward, water is pulled up through the umbrella valve 168 where it can't be returned back in the downward direction.

Figure 4C:
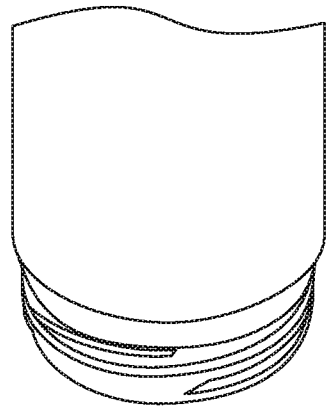
FIG. 4C is a close-up exploded view of a portion of the plunger portion of the walking stick of the instant invention.
Figure 4C:
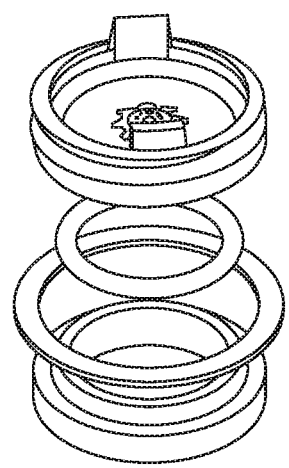
Figure 4D:
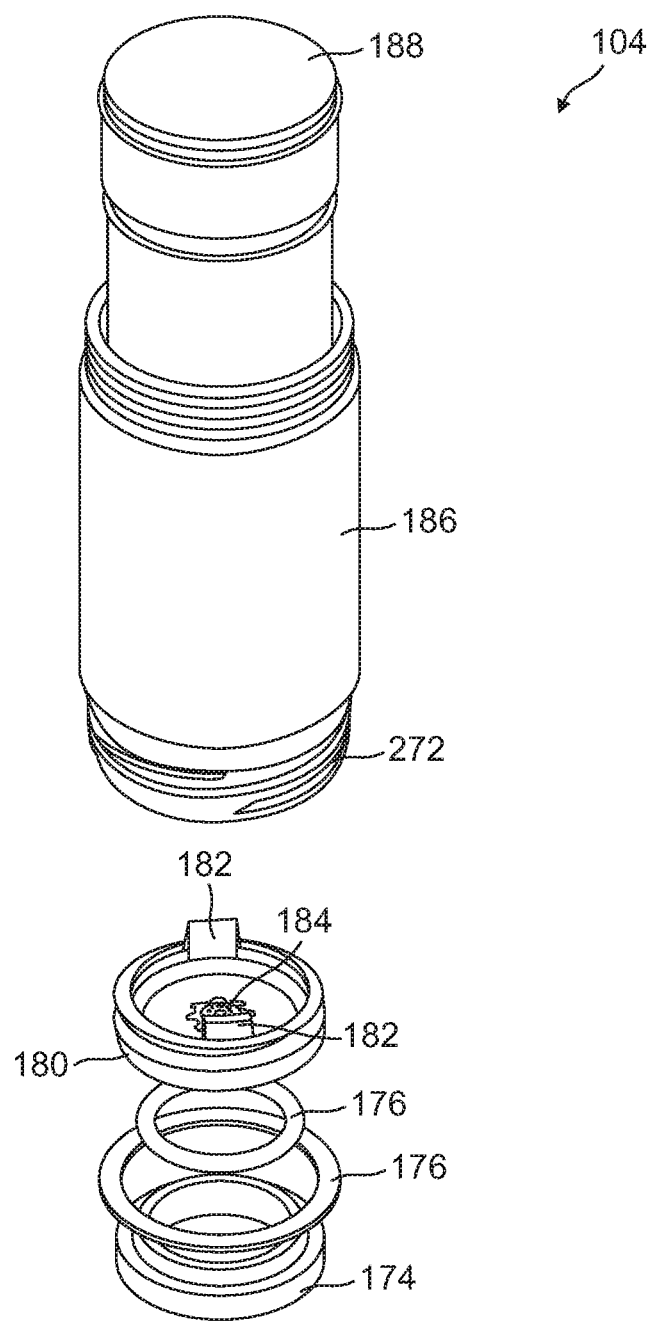
FIG. 4D is an exploded view of the lower filter housing of the walking stick of the instant invention as it connects to the filtration portion of the walking stick of the instant invention.

FIG. 4C shows an exploded view of the components above the umbrella valve 168. Above the umbrella valve 168 is a wiper valve 174, also known as a wiper seal, which wipes the plunger rod 150 and internal parts of the sheath 152 clean of any particulate matter that may have made its way into the water purification assembly 104. Above the wiper valve 174 is a first gasket 176 followed by a second gasket 178 insuring a good seal. Atop the second gasket 178 is a filter connection piece 180 that is substantially disc shaped with two upwardly projecting teeth 182 and a basin in the middle into which a gasket 184 is situated. The upwardly projecting teeth 182 provide a means of attaching to the bottom of a filter 188 housed inside of a filter housing 186 which has threads 272 that attach to the top of the sheath 152. The filter 188 has a plurality of apertures 190 along its bottom (See FIG. 5A) that allow for the teeth 182 on the filter connection piece 180 to connect and secure the filter 188 thereon. FIG. 4D shows a taller view from FIG. 4C wherein the filter 188 is more clearly seen exploding outwardly from the bottom of the filter housing 186.

Figure 5A:
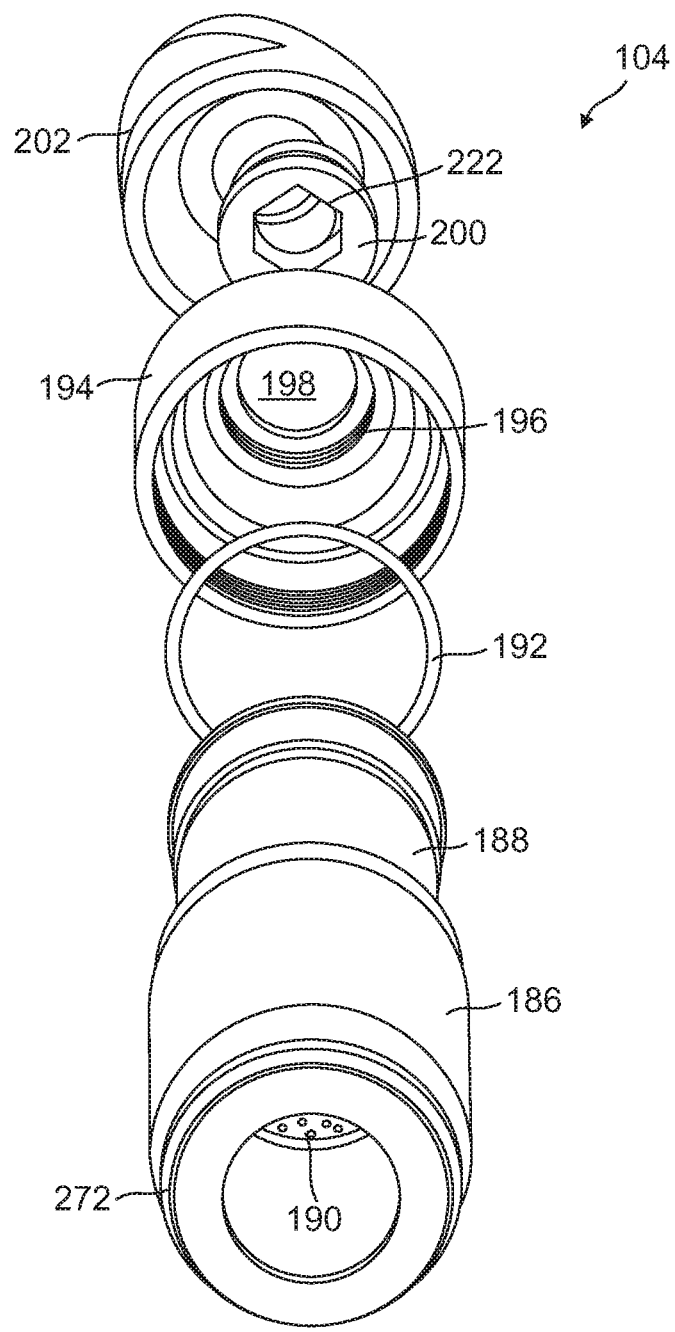
FIG. 5A is a bottom exploded view of the upper portion of the walking stick of the instant invention.

FIG. 5A shows an exploded bottom view starting with the bottom of the filter housing 186 with the filter 188 therein and the plurality of holes 190 mentioned above. Above the filter 188 is another sealing gasket 192 followed by a filter cap 194 at the top of the filter housing with threads 196 on the inside that surround an aperture 198 into which a hex-shaped fitting 200 threadably attaches thereto. Above the hex-shaped fitting 200 is a bottom cap 202 which is both the top of the water purification assembly 104 and the bottom of the handle assembly 132.

The filter device is removable. Some examples of the filter device include a hollow fiber, a carbon filter, a charcoal filter, a silica depth, a ceramic filter, a fiberglass filter, or another suitable media. In some embodiments, the filter device includes a pore size of less than 0.4 microns (e.g., 0.2 or 0.1 microns). The water purification assembly may include various sizes and/or capacity. For example, the water purification assembly may be configured to filter large volumes (e.g., multiple gallons) of water, which may provide potable water for multiple people. Alternatively, the water purification assembly may be configured to filter a personal amount of water (e.g., about a gallon).

Figure 5B:
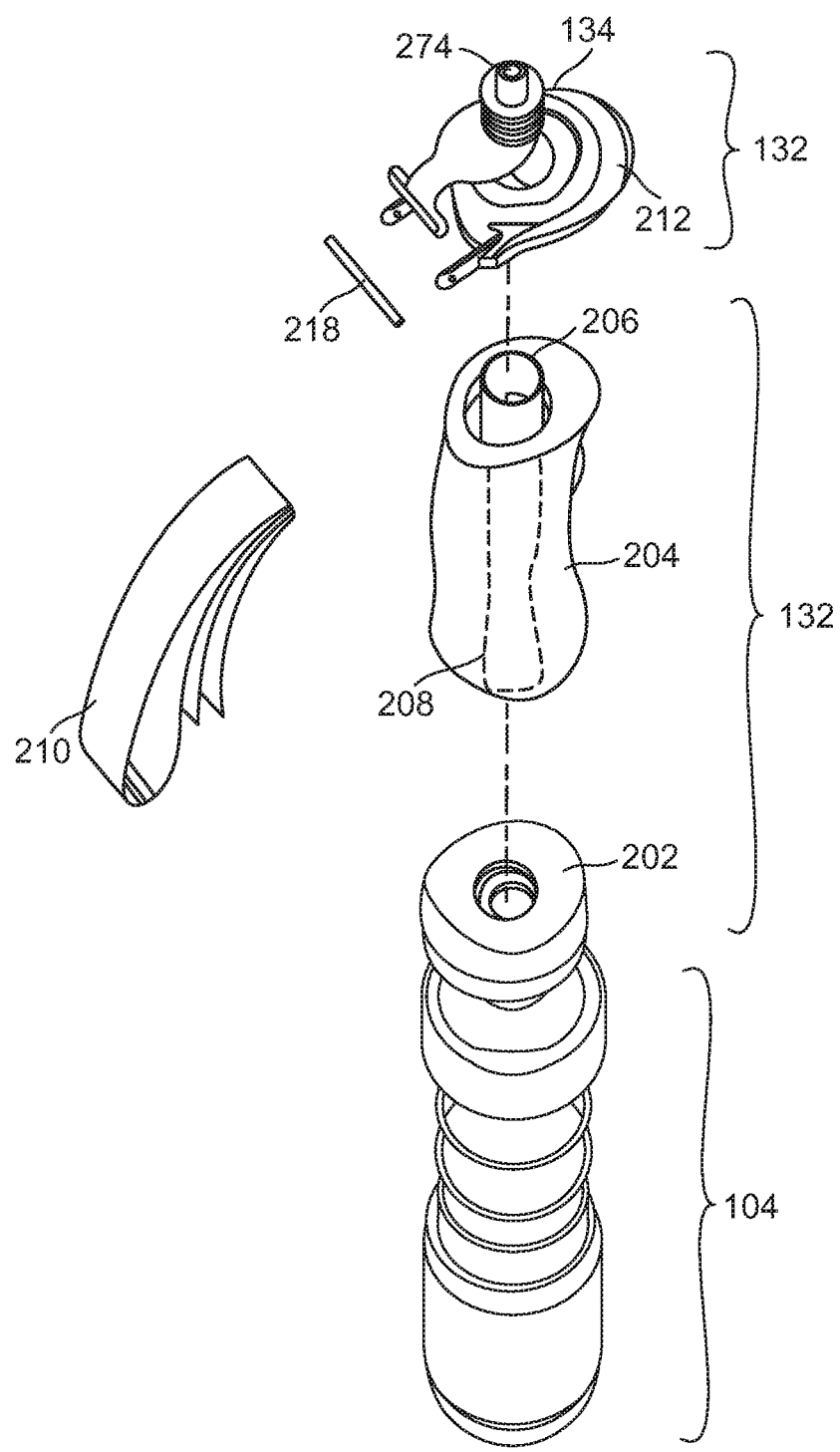
FIG. 5B is a top exploded view of the pump housing of the walking stick of the instant invention as it connects to the filtration portion of the walking stick of the instant invention.

FIG. 5B shows an exploded view of the handle assembly 132. At the base of the handle assembly 132 is the bottom cap 202 that connects it to the water purification assembly 104. This piece has an aperture therethrough and it attaches to a foam grip handle 204 that is made of a deformable material such as plastic or foam. Inside of the foam grip handle 204 is another portion of the rod assembly 206 that extends therethrough and which has a flange 208 at the bottom for stability. Throughout the walking stick 100 are a series of rods for the rod assembly as described, each being detachable on its own rather than one long rod that extends the length of the walking stick 100.

The rod assembly 102 or components thereof may be comprised of aluminum, copper, steel, plastic, carbon fiber, wood, or any other suitable material.

Figure 6B:
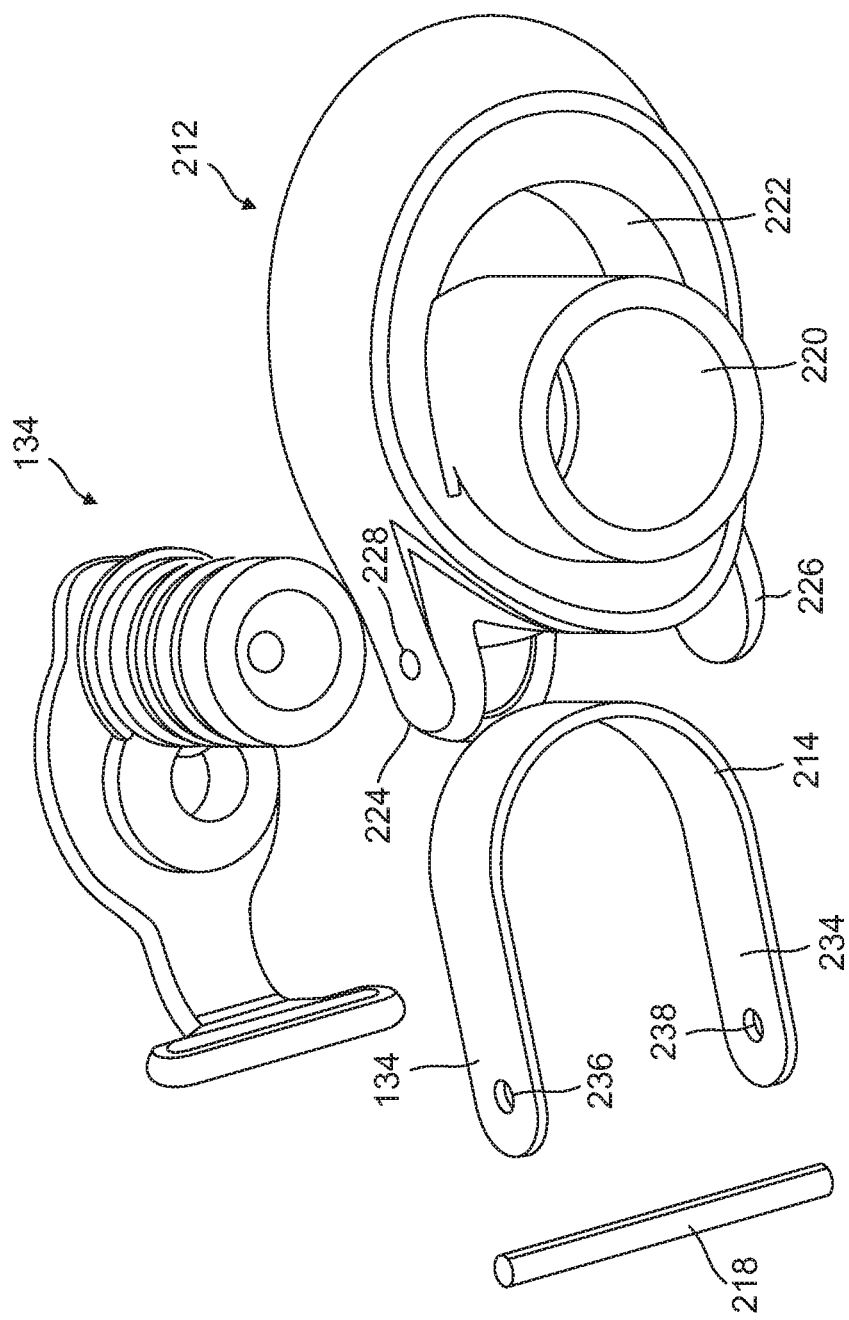
FIG. 6B is a bottom exploded view of the outlet portion of the walking stick of the instant invention.

The outlet assembly 134 and the top cap 212 of the walking stick 100 is shown exploded in FIGS. 6A-6B. The top cap 212 of the walking stick 100 has a hand strap 210 attached thereto. The top cap 212 is constructed to attach to the rod 206 in the handle assembly 132 through a cylindrical conduit member 220. The base portion of the top cap 212 has two members 224, 226, each with an aperture 228, 230 bored therethrough. A steel horse-shoe shaped member 214 is formed with two members 232, 234 that correlate in shape with the members 224, 226 of the top cap 212 and terminate in apertures 236, 238 that line up with the apertures 228, 230 in the corresponding members 224, 226 of the top cap 212. A groove 222 in the bottom of the capping piece 212 allows for the placement therein of the horse-shoe member 214 which is secured thereto with a locking pin 218. This construction allows for the even distribution of weight on the walking stick 100.

A gasket 216 separates the top cap 212 from the outlet assembly 134 through which the filtered water can exit through the top hole 274 of the walking stick 100. The outlet assembly 134 can take many forms, as illustrated provides a cap and an exit for the filtered water which can be collected as needed therefrom.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A walking stick, comprising:
   a rod assembly that extends from a first end to a second end along a longitudinal direction of the rod assembly, wherein the rod assembly includes at least one rod section;
   a water purification assembly that is integrated with the rod assembly, and
   a pump mechanism that is configured to impose a pressure gradient in the water purification assembly, wherein
      the pump mechanism includes a plunger that is physically coupled to a handle portion, said plunger being surrounded by a protective sheath,
      a motion of the plunger relative to the water purification assembly draws water into an inlet tube that is positioned in the rod section and through the water purification assembly, and
      the motion of the plunger results from translation of a handle portion in substantially the longitudinal direction of the rod assembly;
   a water inlet assembly with a first filter device inside of a first filter housing, wherein the water purification assembly includes a second filter inlet and a second filter housing; and the second filter housing defines a filter volume configured to receive a second filter device that is configured to remove at least a portion of contaminants from the water through imposition of the pressure gradient in the inlet tube and the filter volume.

2. The walking stick as defined in claim 1 wherein said first filter includes an aperture that his offset from said first end that can rotated to line up with an aperture in said first end.

3. The walking stick as defined in claim 1 wherein a plunging valve sits atop said plunger, said plunger valve having a plurality of apertures through which water can flow upwardly therethrough from said rod assembly, said plunging valve being checked by an umbrella valve above said plunging valve.

4. The walking stick as defined in claim 3 wherein a wiper valve sits atop said umbrella valve to wipe the interior of said sheath clean of particulates.

5. The walking stick as defined in claim 4 wherein a filter connection piece is situated above said wiper valve wherein said filter connection piece includes two upwardly projecting members that screw into a bottom of said second filter device.

6. The walking stick a defined in claim 1 wherein said second filter housing is topped with an cap that threadably attaches to a hex-shaped fitting to secure said second filter housing to said walking stick.

7. The walking stick as defined in claim 6 further comprising a handle assembly comprising a grip that attaches to said second filter housing wherein a rod portion is embedded inside of said grip, said rod portion attaching to said cap on one end and extending towards a top cap on the opposite end.

8. The walking stick as defined in claim 7 wherein said top cap has a conduit attachable to said rod portion and a groove on the underside of said top cap with two extending members.

* * * * *